United States Patent [19]

Kaneda et al.

[11] Patent Number: 4,539,091
[45] Date of Patent: Sep. 3, 1985

[54] ELECTRODIALYSIS DESALINATION PROCESS AND SYSTEM FOR SEAWATER

[75] Inventors: Hiroshi Kaneda; Kenji Shibata, both of Kure; Mitugu Nomura; Fumihiko Sano, both of Ohtemachi, all of Japan

[73] Assignee: Babcock-Hitachi, Ltd., Tokyo, Japan

[21] Appl. No.: 537,550

[22] Filed: Oct. 3, 1983

Related U.S. Application Data

[63] Continuation of Ser. No. 133,962, Mar. 26, 1980, abandoned.

[51] Int. Cl.$^3$ .............................................. B01D 13/02
[52] U.S. Cl. .................................. 204/301; 204/182.5; 126/433; 126/417; 126/440; 126/438; 203/100; 203/DIG. 1
[58] Field of Search ............... 204/180 P, 301; 165/2, 165/485; 126/421, 440, 447, 433, 417, 438; 203/100, DIG. 1

[56] References Cited

U.S. PATENT DOCUMENTS

| | | | |
|---|---|---|---|
| 3,075,908 | 1/1963 | Kollsman | 204/301 X |
| 3,390,672 | 6/1968 | Snelling | 126/433 |
| 4,044,948 | 8/1977 | Bottum et al. | 126/421 X |
| 4,093,527 | 6/1978 | Tanno et al. | 204/301 |
| 4,130,110 | 12/1978 | Bottum | 126/421 |
| 4,141,825 | 2/1979 | Conger | 204/180 P |
| 4,158,354 | 6/1979 | Carden | 165/2 |
| 4,160,713 | 7/1979 | Matsuzaki et al. | 204/180 P |
| 4,191,172 | 3/1980 | Walch, Jr. et al. | 126/421 |
| 4,270,520 | 6/1981 | Mahdjuri et al. | 126/433 |
| 4,291,676 | 9/1981 | Asselman et al. | 126/433 |

FOREIGN PATENT DOCUMENTS 55-44352  3/1980  Japan .

Primary Examiner—John F. Niebling
Assistant Examiner—B. J. Boggs, Jr.
Attorney, Agent, or Firm—Mary Louise Beall

[57] ABSTRACT

An electrodialysis desalination process for seawater comprising the steps of collecting seawater and heating same by solar heat; subjecting seawater thus heated to electrodialysis; and separating same into two portions of a diluted solution and a concentrated brine, is provided, as well as the same system comprising a preheater utilizing solar heat for preheating seawater, an electrodialyser for separating seawater thus preheated by said preheater into said two portions, and means for supplying seawater to the preheater and then from the preheater to the electrodialyser. Various modifications of the above process and system are disclosed. According to the present inventions, electric power consumption in the electrodialysis is saved and solar heat is utilized effectively.

20 Claims, 18 Drawing Figures

ELECTRODIALYSIS DESALINATION PROCESS AND SYSTEM FOR SEAWATER

This application is a continuation of applicatin Ser. No. 133,962, filed Mar. 26, 1980, now abandoned.

BACKGROUND OF THE INVENTION

1. Field of the Invention

The present invention relates to an electrodialysis desalination process for producing fresh water from seawater, and to an electrodialysis desalination system using the electrodialysis process and solar heat.

2. Description of the Prior Art

Such a process is well known wherein seawater is concentrated and separated into two portions including the concentrated brine and the diluted solution by an electrodialysis process. The electrodialyser for use in said process is constructed such that cation exchange membranes for selectively passing cations and anion exchange membranes for selectively passing anions are arranged in an alternate pattern between a pair of electrodes. When direct electric potential is applied between the two electrodes, cations are transferred to the negative electrode and anions are transferred to the positive electrode, and those ions are selectively passed through ion exchange membranes, and dilution compartments and concentration compartments are formed in an alternate pattern between the two electrodes through the ion exchange membranes. Fresh water is taken out of said dilution compartments and concentrated brine is also taken out of said concentration compartments.

It is also known in the electrodialysis desalination process for seawater that a compressed air is introducdd into the concentration compartment in order to prevent the membrane fouling and reduce the concentration polarization therein.

SUMMARY OF THE INVENTION

Seawater to be fed to the aforesaid electrodialyser is subject to sharp fluctuations in temperature according to the time of year, and the temperature suitable for the electrodialysis is not always obtainable. It is found that the higher the temperature of seawater supplied to the electrodialyser is, the more the electrophoresis of ions is facilitated and the less the electric power consumption is. However, if the temperature is too high, it is not desirable because it adversely affects the material quality of the ion exchange membranes, and it follows that there exists a certain range of temperature suitable for heating.

An object of the present invention is to provide a seawater desalination process wherein seawater is preheated by solar heat to decrease the electric power consumption in the electrodialysis in the desalination of seawater.

Another object of the present invention is to provide a solar electrodialysis desalination system wherein stable preheating of seawater supplied is effected without being affected by the weather conditions, and the temperature of preheating can be desirably controlled.

A further object of the present invention is to provide a preheating device for seawater supplied, wherein the number of movable components or parts such as valves and pumps is minimized in solar heat collectors and heat exchangers, so that the maintenance can be easy and the operating efficiency can be high.

A still further object of the present invention is to provide an efficient solar seawater preheating device in said desalination system.

In accordance with the present invention, there is provided a solar electrodialysis desalination process comprising the steps of: collecting seawater and heating same by solar heat; and subjecting seawater thus heated to electrodialysis process and separating same into two portions including diluted solution and concentrated brine.

In accordance with the present invention, there is also provided a solar electrodialysis desalination system for seawater comprising: a preheater utilizing solar heat for preheating seawater; an electrodialyser for separating seawater thus preheated into two portions including a diluted solution and a concentrated brine; and means including pipelines for supplying seawater to said preheater, and then from said preheater to the electrodialyser.

In accordance with the present invention, there is also provided an electrodialysis desalination process wherein dilution compartments and concentration compartments formed by the alternate arrangement of cation exchange membranes and anion exchange membranes between two electrodes are serially connected to one another in two stages or more and seawater is successively supplied to said dilution compartments and concentration compartments for electrodialysing, being of such an arrangement that the seawater partially desalinated is extracted from the first dilution compartment or the following dilution compartments and heated, and thereafter, is supplied to the further following dilution compartments.

BRIEF DESCRIPTION OF THE DRAWINGS

The present invention can be fully understood from the following description taken in connection with the accompanying drawings wherein like elements are given like reference numerals and in which.

DETAILED DISCRIPTION OF THE INVENTION

Figure 1:
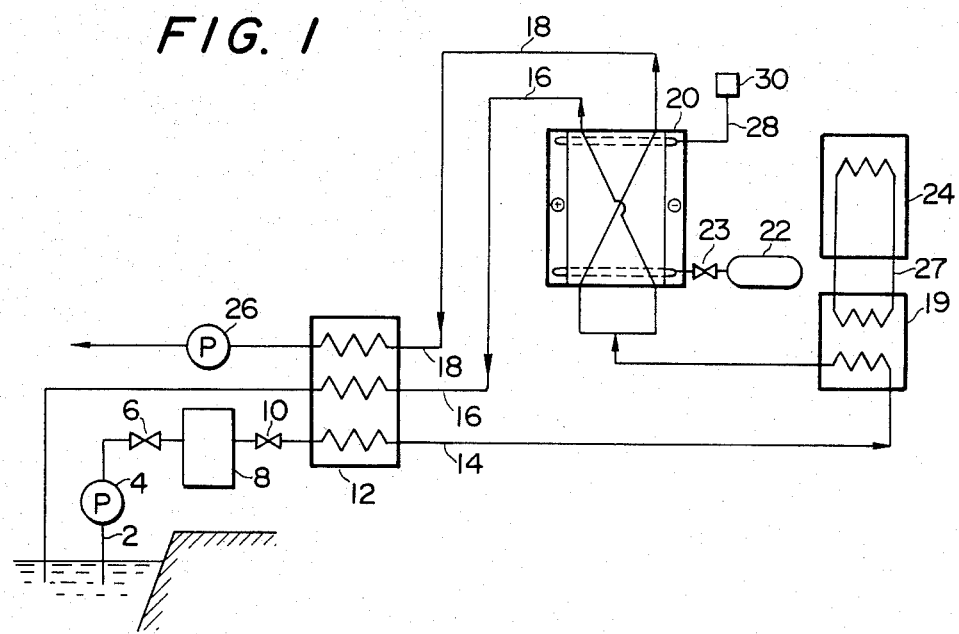
FIG. 1 is a flow diagram of a preferred embodiment of a desalination system according to the present invention, by use of an electrodialyser and a preheater for seawater to be fed to the electrodialyser.

A typical solar electrodialysis desalination system according to the present invention is shown in FIG. 1. Referring to FIG. 1, seawater is introduced by a pump 4 from a line 2 through a valve 6 to a filter 8 where solid particles such as sand are removed therefrom, passes through a valve 10 and a heat recoverer 12 where the seawater recovers through a heat transfer medium enclosed therein the heat of concentrated brine in a line 16 and of fresh water in a line 18 so as to be preheated, both of the brine and fresh water being sent from an electrodialyser 20. Said seawater thus preheated is sent through a line 14 to a heat exchanger 19, where it is heated by a heat transfer medium enclosed therein, and supplied to the electrodialyser 20. The heat transfer medium enclosed in the heat exchanger 19 is supplied with heat from a heat source such as a heat collector 24 through a line 27.

The electrodialyser 20 is provided with an air compressor 22 for introducing air bubbles to each compartment formed between the membranes, thus preventing the membrane fouling and reducing the concentration polarization. Compressed air is introduced to each compartment from under the electrodialyser through a valve 23, passes between the membranes and reaches the upper portion of the electrodialyser 20, where it is discharged into a gas reservoir 30 through a line 28. Fresh water from the electrodialyser 20 is passed through the line 18 and the heat recoverer 12 by a pump 26 and then stored, while concentrated brine passes through the line 16 and the heat recoverer 12 and is discharged into the sea.

In the above described electrodialysis desalination system, it is contemplated that seawater supplied to the electrodialyser is preheated by the heat recoverer 12 and the heat exchanger 19, so that the electrophoresis of ions in the electrodialyser can be facilitated and the electric power consumption can be reduced.

The exhaust gas through line 28 from the electrodialyser 20, which temperature is of 40°~70° C., for example, may be recycled to the compressor 22 and heat can be recovered.

As for the heat source 24, solar heat, excess heat or waste heat in various industries can be utilized. The solar heat, in particular, is a heat source widely available and suitable for the desalination of seawater.

However, the process utilizing solar heat presents such a disadvantage that fluctuations with time is very high, for example, heat collection in value fluctuates to a considerable extent due to the weather conditions, the energy supply is interrupted at nights, and the like. For instance, in the night time, where the solar heat is not available, and in the case of cloudy weather where the ambient temperature is low, there are encountered such shortcomings that the temperature of the heat transfer medium in the heat collector 24 becomes lower than the temperature of the heat exchanger 19, whereby heat may be transferred from the heat exchanger 19 to the heat collector 24 through the line 27. Furthermore, during summer where the solar heat is abundantly available, the heat supplied to the heat exchanger 19 becomes high in value, whereby the temperature of seawater supplied is raised to 90° C. or higher, for example, thereby the material of the dialysis membranes is degraded and shortened in its service life. Further, in order to receive the supply of heat from the heat collector 24, it is necessary to circulate the heat transfer medium, and consequently, flow control means such as a pump and flow control valve are essential. From this reason, there are encountered such disadvantages that troubles occur with the components or parts for the flow control and the maintenance becomes troublesome.

Figure 2:
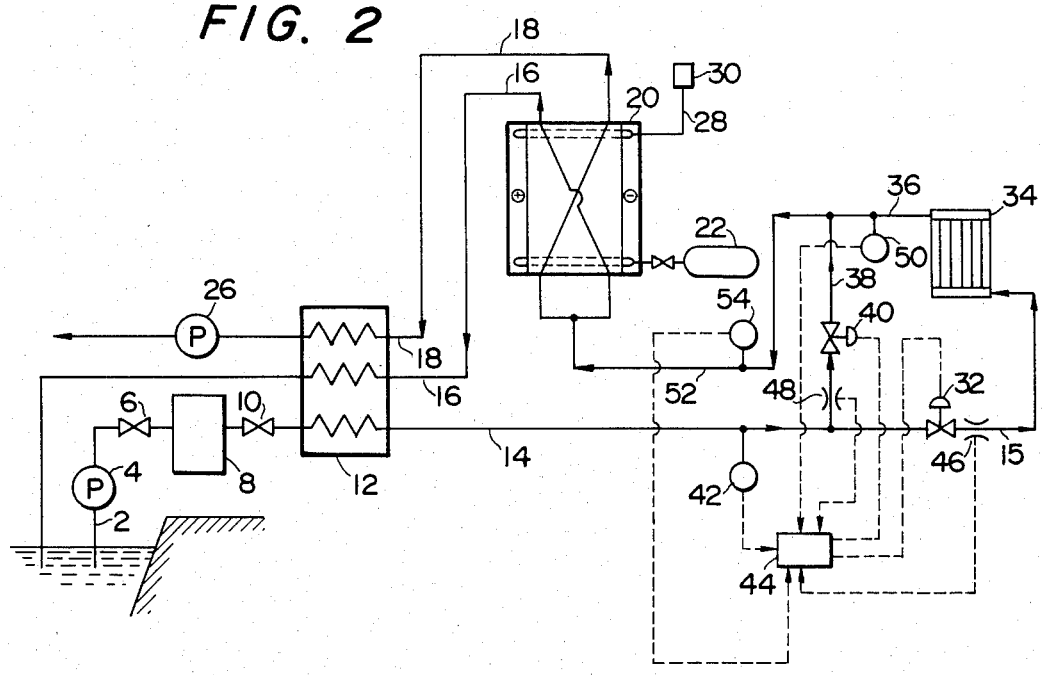
FIG. 2 is a flow diagram of a preferred embodiment of a desalination system according to the present invention, which is provided with a bypass line between the line leading from the preheater to the electrodialyser and the line for supplying seawater to the preheater.

FIG. 2 is a flow diagram of an improved seawater electrodialysis desalination process according to the present invention. Seawater is lifted by the pump 4, passes through a sand bed filter 8 and the heat exchanger 12, flows through main lines 14 and 15 and a flow control valve 32, is introduced to a solar collector 34, where it is preheated, and then, introduced to the electrodialyser 20 through pipelines 36, 52. Fresh water separated in the electrodialyser is sent to a fresh water storage tank through the line 18 and the heat exchanger 12, while concentrated brine is passed through the line 16 and the heat exchanger 12, and discharged into the sea.

The improvement is that a bypass line 38 with a bypass flow control valve 40, which bypass the lines 14 and 36, are provided, and the flow control valves 32 and 40 are controlled so that the temperature of seawater introduced to the electrodialyser 20 can be maintained at a suitable temperature. More specifically, the lines 14 and 15 are provided with a thermometer 42 and a flow meter 46, respectively, and the bypass line 38 is provided with a flow meter 48. Furthermore, the outlet line 36 of the solar collector 34 is provided with a thermometer 50, and the inlet line 52 of the electrodialyser is provided with a thermometer 54. Signals emitted from said thermometers 42, 50 and flow meters 46, 48 are supplied to a controller 44, whereby the flow ratio between the lines 15 and 38 is set and the openings of the flow control valves 32 and 40 are controlled, so that the value measured by the thermometer 54 can be equalized to a predetermined value. The signal measured and emitted by the thermometer 54 is used for feedback control of the controller 44.

In accordance with the above embodiment, the solar heat is collected by the solar collector 34 in sunshine, whereby the inlet temperature of the electrodialyser 20 is maintained at a suitable temperature between 30° and 90° C. for example, so that the efficiency of the desalination system can be improved. On the other hand, in the case of cloudy and cold weather, and particularly at night, the heat collector conversely works as a heat radiator. Consequently, it is not suitable to supply seawater through the line 15. In that case, the command signal from the controller 44 may cause the flow control valve 32 to be fully closed to make the solar collector 34 inoperable.

Figure 3:
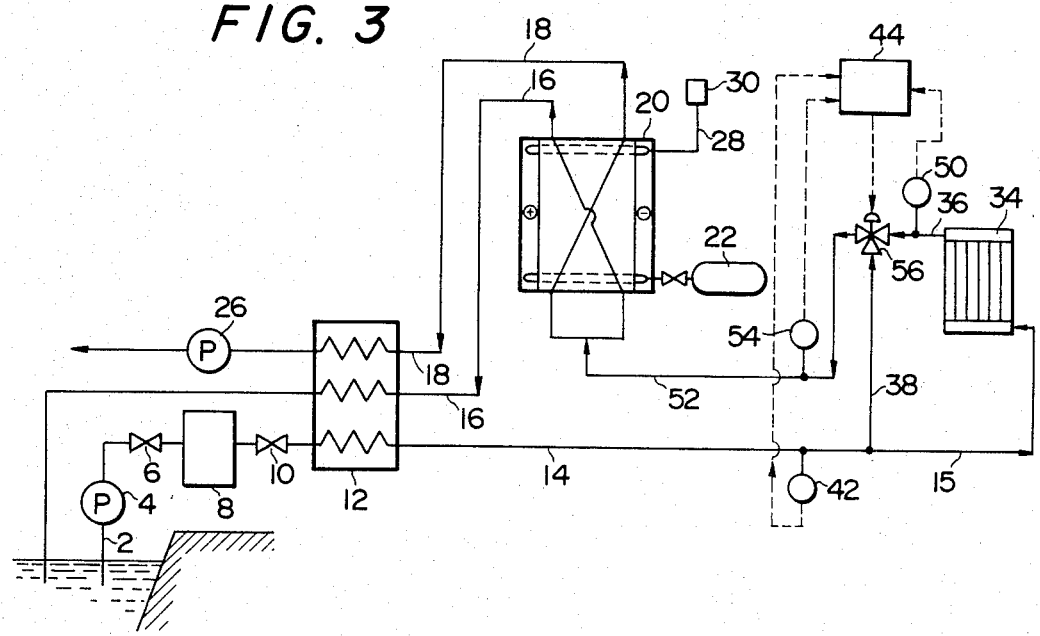
FIG. 3 is a flow diagram of a preferred embodiment of a desalination system according to the present invention, which is provided with the same bypass line as that of FIG. 2 and a three-way flow control valve.

FIG. 3 shows a second embodiment, in which, instead of flow control valves 32, 40, a three-way flow control valve 56 which is capable of controlling flow rates, is provided at a joint portion between the lines 36 and 38, whereby said three-way flow control valve 56 is controlled by signals obtained from the thermometer 42 where the seawater temperature is measured, the thermometer 50 where the outlet temperature of the heat collector is measured, and the thermometer 54 where the inlet seawater temperature of the electrodialyser 20 is measured.

With the embodiment shown in FIGS. 2 and 3, the temperature of seawater supplied to the electrodialyser 20 can be controlled to the optimum degree. The solar collector 34 can be used only when the solar heat is obtainable, and said collector 34 can be removed from the seawater supply line system and made inoperable while the solar heat is not available.

Figure 4:
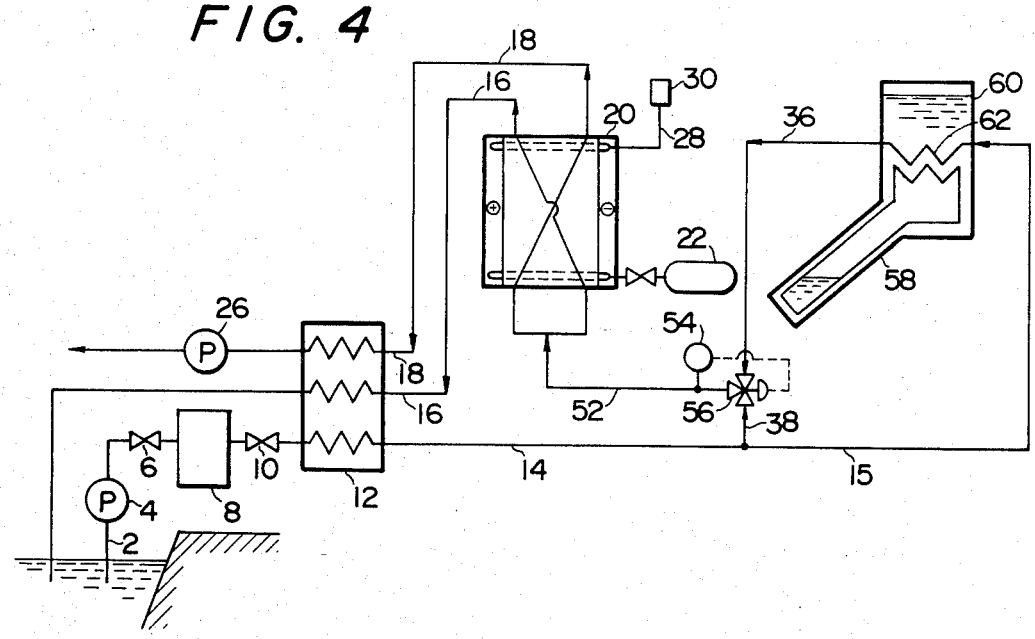
FIG. 4 is a flow diagram of a preferred embodiment of a desalination system according to the present invention, which is provided with a bypass line, a three-way flow control valve, and a heat accumulator with a solar collector.

FIG. 4 shows another system according to the present invention, wherein, instead of the heat collector 34 in the embodiment shown in FIGS. 2 and 3, a combination of a heat collector 58 and a heat accumulator 60 is used, a seawater supply line 15 is extended through the heat accumulator 60 where seawater is preheated and the three-way flow control valve 56 is adapted to be controlled only by the temperature signal from the seawater supply line 52 to the electrodialyser 20. Said flow control valve 56 is adapted to proportionally control receivable quantities of two kinds of seawaters different in temperature from each other. The control is effected by a signal emitted from a temperature transmitter 54 provided on the inlet main line 52 to the electrodialyser 20, the temperature transmitter 54 recording the seawater temperature and emitting a temperature signal to the three-way flow control valve 56. The heat accumulator 60 comprises a vessel having a heat transfer medium enclosed therein, said heat transfer medium incorporating a heat exchange section 62 of the line 15. The heat collector 58 is integrally connected to the bottom of the heat accumulator 60. Said heat collector 58 is adapted to irreversibly transfer the heat to the heat accumulator 60 and heat pipes are preferably used for the purpose of transferring the heat.

In FIG. 4, seawater is sent by the pump 4 to the sand bed filter 8, where the solid particles such as sand are removed therefrom, and then sent to the heat recoverer 12, where it undergoes heat exchange with concentrated brine in the line 16 and fresh water in the line 18, and becomes elevated in temperature. For example, fresh water and concentrated brine are lowered in temperature from about 40° C. to 22° C. in the heat recoverer 12, while seawater is raised in temperature from about 17° C. to 33° C. Seawater thus heated passes through lines 14 and 15, and the heat exchange section 62 in the heat accumulator 60, where it undergoes heat exchange with a fluid such as water which temperature is of 50° C. to 90° C., and is raised in temperature to about 45° C. Thus, the preheated seawater passes through the outlet line 36, is supplied to the three-way flow control valve 56, where it is mixed with seawater from the line 14, which temperature is of 33° C., so as to become seawater being within a given range of temperature, 40° C. for example, and is fed to the inlet line 52 of the electrodialyser 20.

Seawater supplied to the electrodialyser 20 is heated to a given range of temperature, about 70°~90° C. at the maximum for example, in view of the limit of thermal resistance of the ion exchange membranes, and about 30° C. at the minimum from the viewpoint of desalination efficiency. For the operation, the temperature of seawater is preferably maintained within the range of 40°~70° C., for example at about 50° C.

According to the above-mentioned embodiments, the seawater supplied to the electrodialyser 20 can be raised in temperature by passing through the heat exchanger 12 and the heat accumulator 60, and the temperature can be automatically controlled to a suitable degree in the range of 40° C.~90° C., whereby the electric power consumption required for the electrodialyser 20 is reduced, so that fresh water can be produced with high efficiency.

Figure 5:
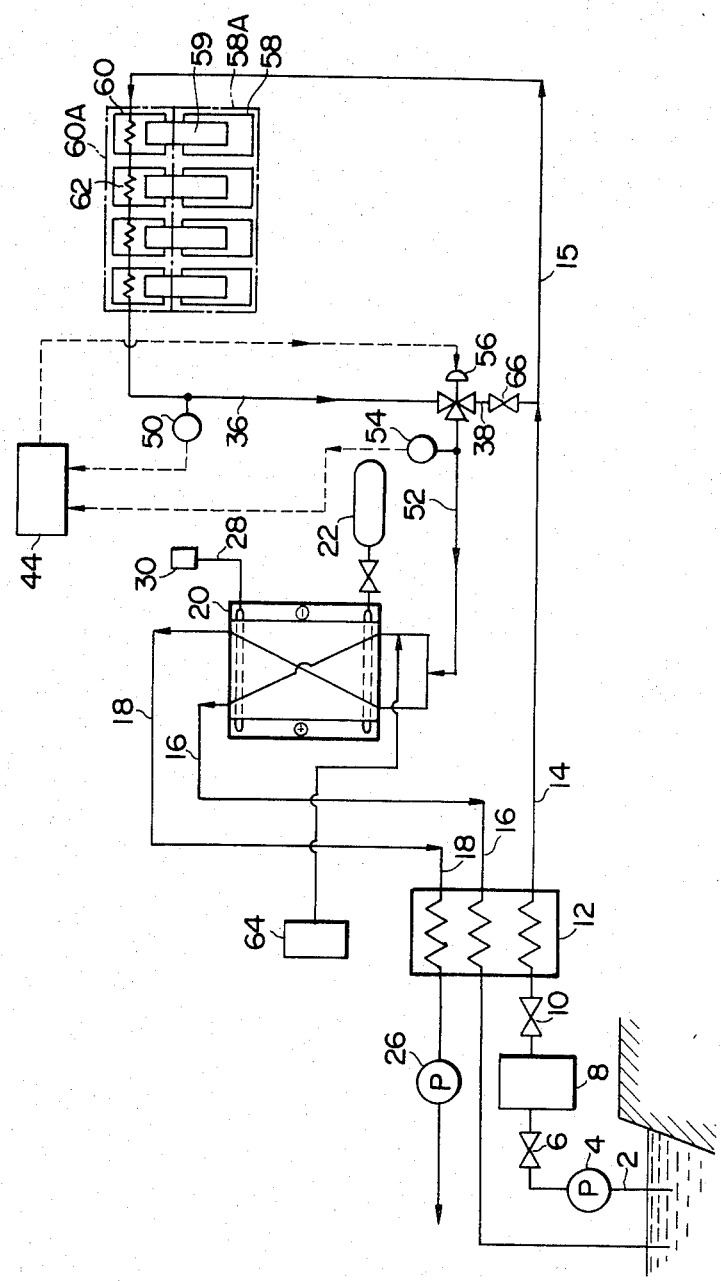
FIG. 5 is a flow diagram of a preferred embodiment of a desalination system according to the present invention, in which solar collectors and heat accumulators are arranged in a multiple stage pattern.

FIG. 5 shows a further embodiment of the present invention, in which heat collectors and heat accumulators are arranged in a multiple stage pattern. In the drawing, seawater undergoes heat exchange with concentrated brine and fresh water in the heat recoverer 12 to become elevated in temperature, flows through the lines 14 and 15, passes through a plurality of heat exchange sections 62 arranged in the heat accumulators 60, and then, is led to the line 36. The heat accumulators 60 are connected to the heat collectors 58 through heat pipes 59, a plurality of heat accumulators 60 and also a plurality of heat collectors 58 are arranged parallelly to form a heat accumulator group 60A and a heat collector group 58A, respectively. Seawater flowing through the line 36 has been usually raised in temperature to about 30°~90° C. while passing through the heat exchange sections 62 of the heat accumulators 60, passes through the three-way flow control valve 56 following the line 36, flows through the line 52, undergoes an addition of a scale inhibitor from a tank 64 if necessary, and is supplied to the electrodialyser 20. Fresh water and concentrated brine from the electrodialyser 20 are discharged in the same manner as described above. Control of the temperature of seawater supplied to the electrodialyser 20 is effected such that temperature signals are sent to the controller 44 from the thermometer 54 on the line 52 and from the thermometer 50 on the line 36, whereupon said controller 44 sends a command signal to the three-way flow control valve 56 to control same. For example, in a case where the temperature of seawater in the line 36 is too high, an appropriate quantity of seawater lower in temperature than seawater in the line 36 is passed through the line 38 branching from the line 14 and connected to the three-way flow control valve 56, through the valve 66, and added to seawater in the line 36, thereby being lowered the temperature of the seawater to a suitable value.

The heat pipes 59 have enclosed therein a heat transfer medium for repeating evaporation and condensation by heating and cooling, respectively. Each heat pipe 59 comprises an evaporating portion, an insulated portion and a condensing portion. The evaporating portion and condensing portion are positioned in the heat collector 58 and heat accumulator 60, respectively. Said heat pipe is installed in an inclined manner from the heat accumulator 60 downwardly to the heat collector 58. As the heat transfer medium to be enclosed in the heat pipe 59, water, methanol, ethanol, benzene, various types of Freons (Freon 113, for example) and the like may be employed. The quantity of the heat transfer medium to be enclosed may be required such that the film of the heat transfer medium may sufficiently cover the entire inner surface of the heat pipe 59. The heat transfer medium enclosed and circulated in the heat collector 58 and heat accumulator 60 may be any one which has been publicly known, water, an aqueous salt solution, molten salt and the like, for example. Inclination of the heat pipe may be required such that the heat transfer medium evaporated in the heat pipe reaches the heat accumulator 60, where it is condensed into a liquid, and said liquid can return to the heat collector 58 by gravity. However, to secure the practical value of heat transfer, the inclination is preferably 5~10 degrees or more, and when the inclination is 30~40 degrees or more, the heat transfer reaches the saturation.

Furthermore, wicks or grooves are provided on the inner surface of the heat pipe, so that the return of the condensed liquid can be made by the utilization of surface tension, but not by gravity. For example, when the wicks are incorporated only in the heat collector of the heat pipe, or the density of wicks is made larger at the side of the heat collector, the inclination of the heat pipe can be made smaller than the above. Furthermore, even in the case the heat pipe is positioned horizontally or the heat accumulator and heat collector are connected to each other upside down, i.e., reversely, if the density of wicks is varied in the longitudinal direction (for example, the density of wicks is decreased toward the heat acmulator), then the return of the liquid made by surface tension can be controlled to have the heat transfer irreversible. In general, the heat quantity transferred from the heat collector to the heat accumulator is increased in proportion with increased diameter of the heat pipe, and the provision of the wicks or grooves reduces the quantity of heat transfer.

The solar heat collected by the heat collector 58 is transferred to the heating pipe 59, whereby the heat transfer medium in the heat pipe is evaporated, and the vapor is elevated in the heat pipe 59 and moves toward the heat accumulator 60. The vapor in the heat pipe 59 is condensed in the heat accumulator 60 to radiate the latent heat, which is accumulated by the heat transfer medium in the heat accumulator 60. The heat transfer medium condensed in the heat pipe 59 returns toward the heat collector 58 by gravity, and is evaporated again to continue the heat transfer.

The abovedescribed operation is effected in the case where the quantity of heat collected in the heat collector 58 is large and the temperature of the heat collector 58 is higher than that of the heat accumulator 60. However, in the case where the quantity of heat collected in the heat collector 58 is low, the heat collector 58 becomes lower in temperature than the heat accumulator 60, whereby the heat tends to be transferred from the heat accumulator 60 to the heat collector 58. However, since almost no heat transfer medium exists in the heat pipe 59 of the heat accumulator 60 at this time, the heat accumulated is hardly transferred to the heat collector 58. Thus, the radiation of heat from the heat accumulator 60 is restricted only to the heat transfer from the main body of the heat pipe 59.

Figure 6:
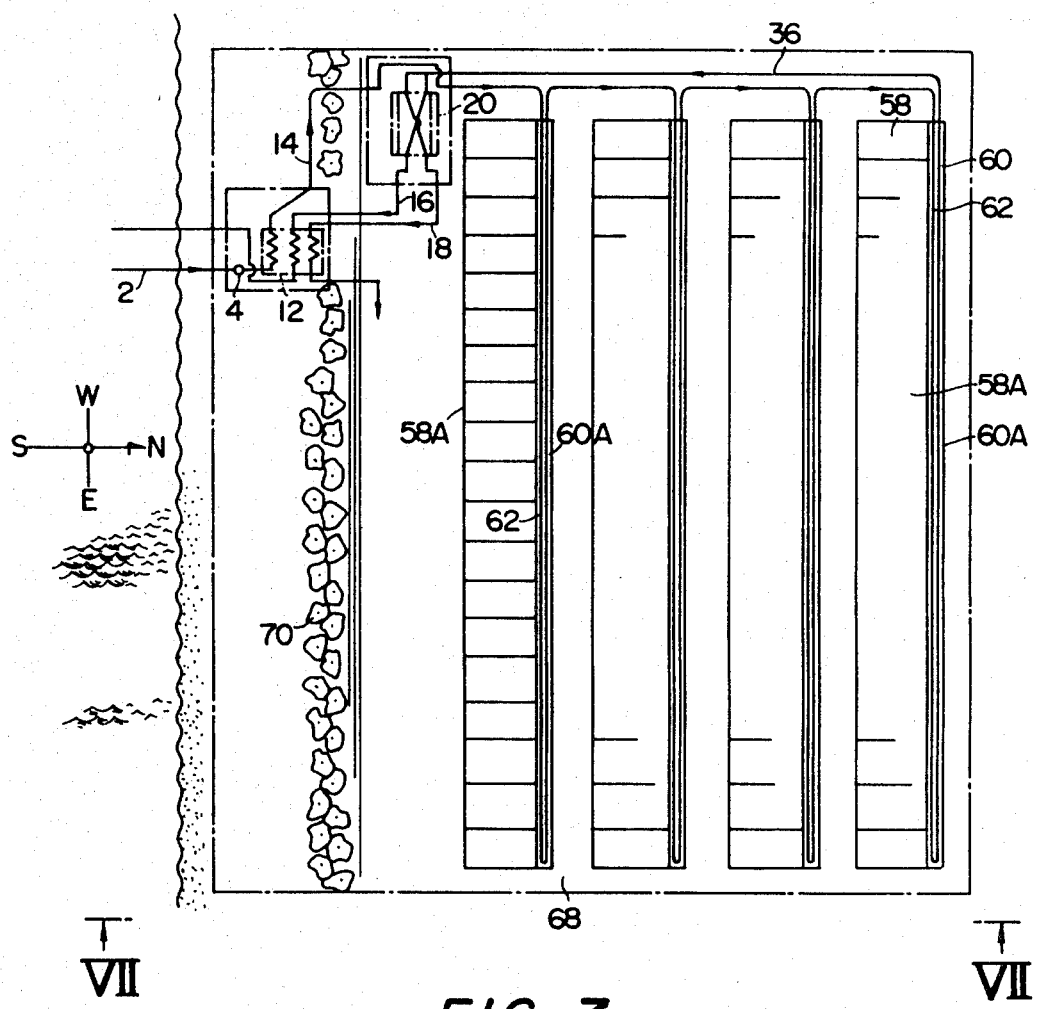
FIG. 6 is a plane view of the seawater desalination system according to the present invention, which is installed on a southwardly inclined ground at the seaside.
Figure 7:
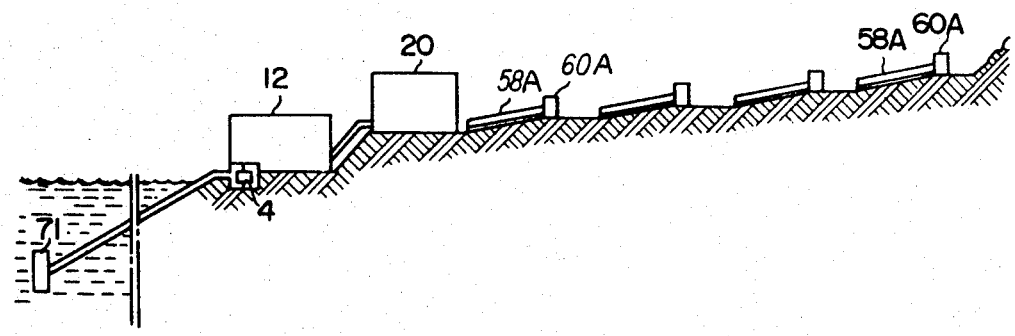
FIG. 7 is a sectional view taken along the line VII—VII of FIG. 6.

FIGS. 6 and 7 are drawings showing the seawater desalination system, in which the heat collector groups 58A and heat accumulator groups 60A as shown in FIG. 5 are arranged on a southwardly inclined ground in stage pattern with the heat collector groups positioned downwardly. In FIG. 6, reference numeral 70 designates a tide-wind shelter forest. A seawater inlet 71 is at a position 100 meter or more distant from the coastline and within the sea. The heat pipes are used as described above, so that the heat can be efficiently transferred from the heat collectors 58 to the heat accumulators 60 and accumulated, and heat radiation from the heat accumulators 60 to the heat collectors 58 can be prevented at nights or during cloudy daytimes. Furthermore, both heat collectors 58 and heat accumulators 60 in plural numbers are provided parallelly, so that the thermal efficiency can be improved, and, in the case where the heat collector or heat accumulator is fallen into troubles by unit, the operation can be continued with no adverse affection exerted on the whole process, thereby making the maintenance easy.

Figure 8:
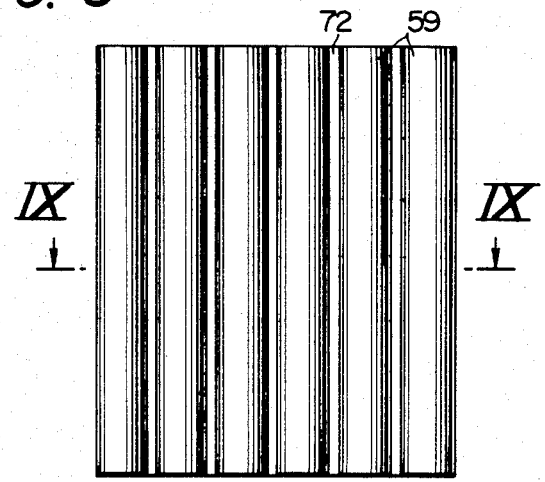
FIG. 8 is a plane view of a preferred embodiment of a heat pipe assembly usable for the present invention.
Figure 9:
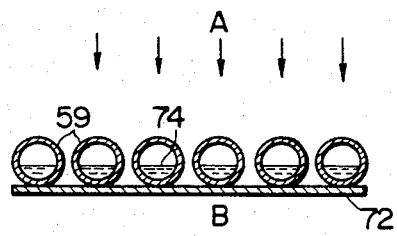
FIG. 9 is a sectional view taken along the line IX—IX.
Figure 10:
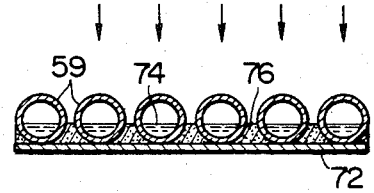
FIG. 10 is a plane view of another preferred embodiment of a heat pipe assembly usable for the present invention.

FIGS. 8, 9 and 10 illustrate constructions of the heat pipe assembly suitably usable for the present invention.

In the heat pipe 59, the working fluid 74 in liquid form is present at the side of the heat collector, i.e., the evaporating portion, into which the heat flows. However, in cases where the distribution of the solar heat flowing into the heat pipe groups disposed in parallel arrangement is not uniform and different from one group to another, the so-called dryout phenomenon, where no liquid remains in the evaporating portion, is caused to the heat pipes, into which a great quantity of heat has flowed, thereby decreasing the heat transfer effect to a considerable extent.

Consequently, it is preferable that, as shown in FIGS. 8 and 9, a plurality of heat pipes 59 are connected to a heat transfer plate 72 at the sides B of the heat pipes opposite to the heat receiving sides A thereof. Said heat transfer plate 72 may be provided along the entire lengths of the plurality of heat pipes, or may be provided only on the evaporating portions thereof.

Connection between the heat pipes and the heat transfer plate may be made by welding, soldering, fastening with bands or any other suitable means, only if the adopted means may bring the outer surfaces of heat pipes and the heat transfer plate into close contact with each other.

Furthermore, it is effective in increasing the heat transfer effect to fill spaces formed between the heat transfer plate 72 and the heat pipes 59 with a filler 76 consisting of a material having good heat transfer property such as metallic powder as shown in FIG. 10. Additionally, instead of filling the spaces with the filler, grooves mating with the heat pipes are formed in a thick heat transfer plate, and the heat pipes may be fitted in said grooves. With such a construction as above, a liquid 74 is enclosed in the evaporating portions of the heat pipes 59, whereby heat transfer between the heat pipes 59 through the heat transfer plate 72 becomes suitable, and ununiform distribution in temperature between the heat pipes does not occur, whereby such problems as dryout of the heat pipes are prevented.

Figure 11:
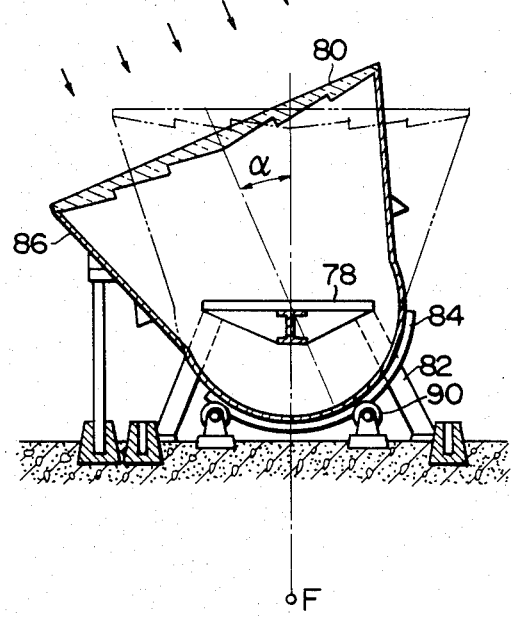
FIG. 11 is an elevational section view of a preferred embodiment of a solar collector usable for the present invention.
Figure 12:
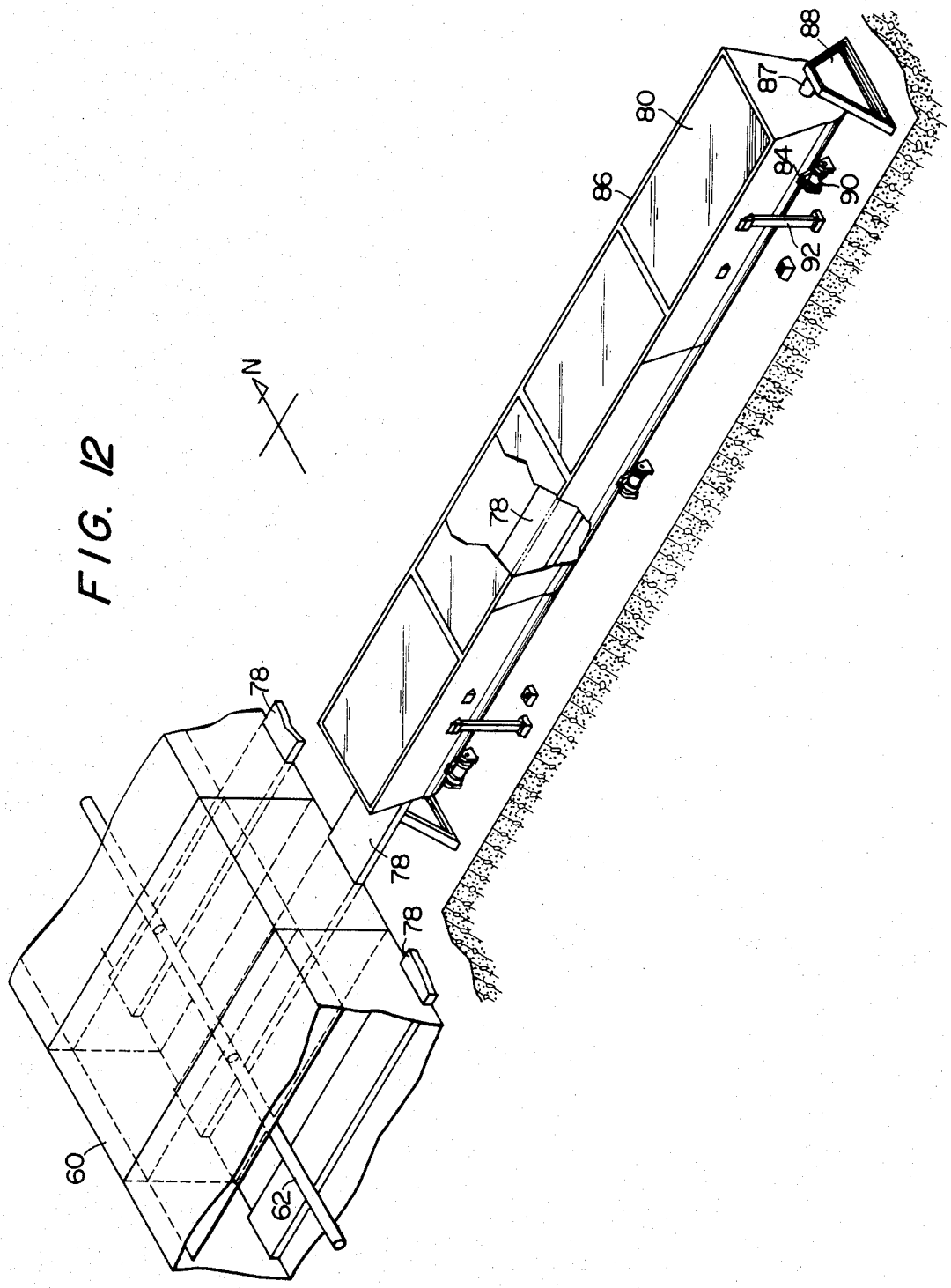
FIG. 12 is a general view of a solar collector and a heat accumulator usable for the present invention.

A preferable embodiment of the heat collector using heat pipes are shown in FIGS. 11 and 12. Said heat collector comprises a Fresnel lens 80 and a heat collecting plate 78 incorporating a plurality of heat pipes arranged parallelly therein. Said plate 78 is disposed horizontally on a support base 82, the Fresnel lens 80 is fixed on a letter 'U' shaped receiver 86 provided at the bottom thereof with guide rails 84, said receiver 86 is rotatably racked across frames 88 through a shaft 87, and the guide rails 84 provided at the bottom of the receiver are supported on sliding wheels 90. Furthermore, the receiver 86 is provided at the side surface thereof with stop 92 for fixing said receiver at a suitably tilted angle. The heat collecting plate 78 is horizontally disposed at an intermediate position between the Fresnel lens and a focal point F thereof. The condensing portion of the heat collecting plate 78 incorporating the heat pipes, i.e., the portion in the heat pipe where the vapor of the fluid is condensed, is disposed in the heat accumulator 60 as shown in FIG. 12, and the heat exchanger 62 for seawater supplied to the electrodialyser is disposed in said heat accumulator 60.

The largest length and width of the Fresnel lens are about 2 m and 1 m, respectively, which are obtainable from the present situation of the manufacturing technique. If the units of Fresnel lenses are connected to one another in the longitudinal direction, then a long Fresnel lens having a length of about 10 m is obtainable, and a long heat collector corresponding thereto can be formed as shown in FIG. 12.

With the abovedescribed construction, solar rays transmitted through the Fresnel lens 80 are focused at a focal point F, and the heat collecting plate 78 is disposed at the intermediate position between the Fresnel lens 80 and the focal point F, whereby all the rays are intercepted by said plate 78, which collects the heat. Even if the incident direction of the solar rays are not perpendicular to the flat face of the Fresnel lens 80, the same thing as above occurs, and consequently, the incident heat rays from various directions are collected by this heat collecting plate 78. Therefore, even in the cloudy weather, scattered rays and scattered heat rays are collected effectively by this heat collector. Additionally, as shown in FIG. 12, the longitudinal direction of the Fresnel lens 80 is coincided with the east-west direction, whereby suitable heat collection can be effected regardless of the change in position of the sun during a day from sunrise to sunset. Furthermore, the Fresnel lens 80 can be desirably shifted in its angle directed toward the sun, from the right angle to degrees alpha for example, whereby the Fresnel lens is adjustable to the optimum angles in accordance with the time of year for example, so that efficient heat collection can be effected. Since the heat collectors are heavy in weight, it is not desirable to frequently adjust the heat collectors in their directions toward the sun. However, the heat collectors are provided therein with the Fresnel lenses being excellent in focusing properties, and consequently, it is sufficient to make seasonal adjustments in the direction of said heat collectors, in general.

Figure 13:
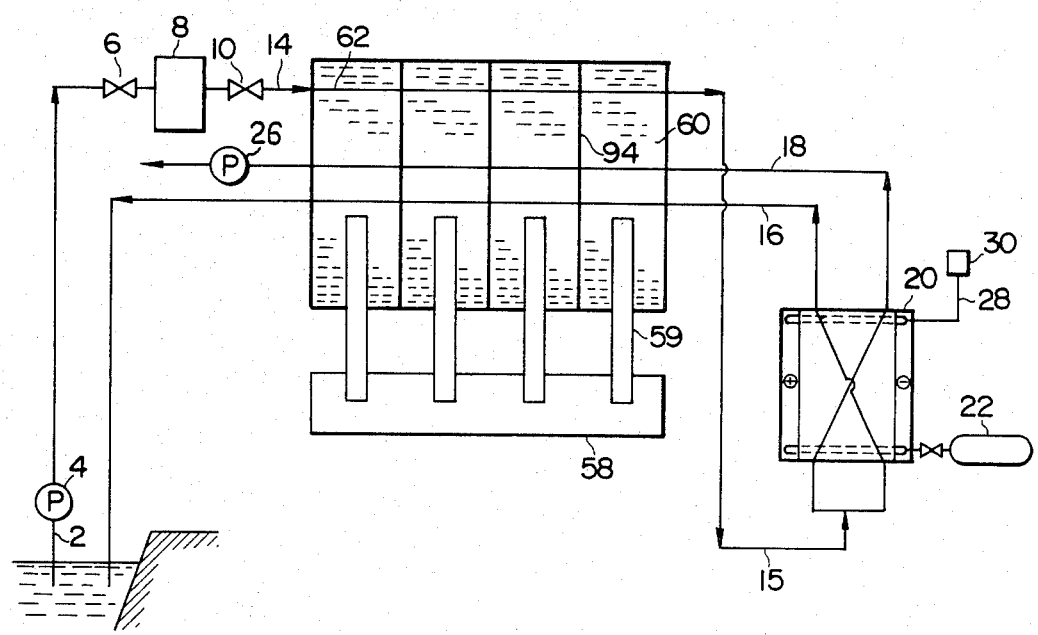
FIG. 13 is a general view illustrating a further embodiment of the solar electrodialysis desalination system according to the present invention.
Figure 14:
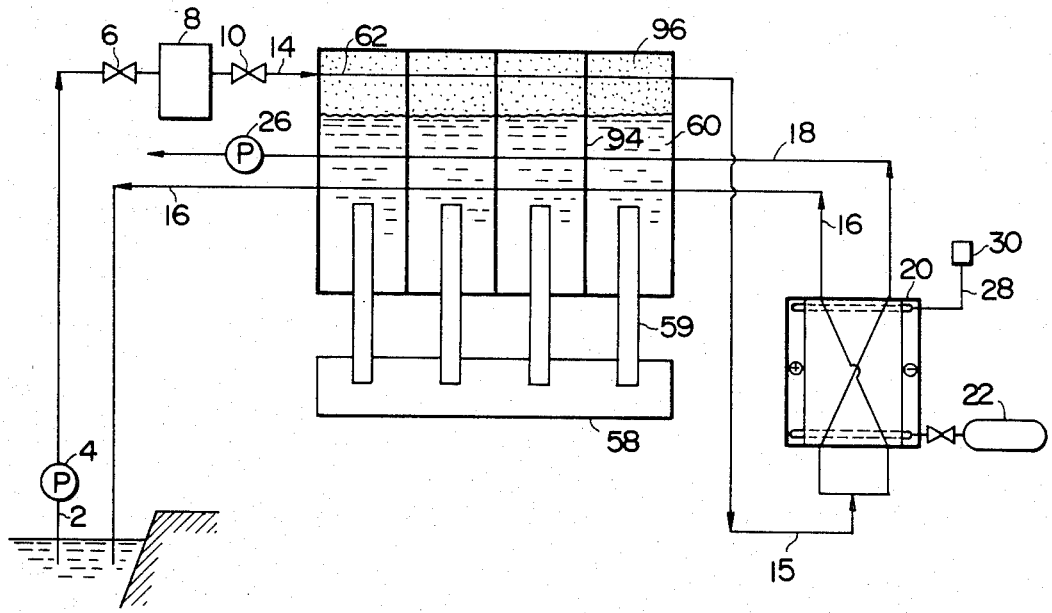
FIG. 14 is a general view illustrating the same embodiment as that of FIG. 13 except that the gaseous phase is formed partially in the heat accumulator.

FIGS. 13 and 14 are flow diagrams illustrating further embodiments of the present invention. In FIG. 13, seawater supplied from the line 14 is passed through the heat exchange section 62 in the heat accumulator 60 to be preheated.

The fresh water line 18 and the concentrated brine line 18 from the electrodialyser 20 are passed through the heat accumulator 60 to recover heat therefrom. The heat accumulators 60 are arranged in parallel with partition walls 94, each heat accumulator 60 is filled with a heat transfer medium, and, in the heat accumulator 60, there is arranged the condensing portion of the heat pipe 59 connected to the heat collector 58 for collecting the solar heat. Seawater from the line 14 passes the heat exchange sections 62 in the heat accumulators 60 to be preheated, thereafter, enters the electrodialyser 20, where it is separated into two portions including fresh water and concentrated brine. The fresh water and the concentrated brine pass through the lines 18 and 16, respectively, enter again the heat accumulators 60, where heat is recovered therefrom, thereafter, the fresh water is recovered by the pump 26 into the storage tank, and the concentrated brine is discharged into the sea. For example, the seawater supplied is heated from 17° C. to 45° C. while it is passing through the heat exchange section 62 of line 14. On the other hand, the concentrated brine and the fresh water through lines 16 and 18 are cooled from 45° C. to 22° C. while they are passing through the heat exchange sections of the lines in the heat accumulators 60. In this case, the heat transfer medium in the accumulator 60 has a temperature gap between the upper and lower portions thereof. The temperatures of heat accumulators 60 change from 26° C. to 47° C. successively in the upper portions, and from 20° C. to 37° C. successively in the lower portions.

In this embodiment, the heat accumulator 60 is divided to form a small chamber, so that heat from the heat collector 58 can be transferred to the accumulators 60 by heat pipes 59 uniformly and efficiently. Furthermore, the fresh water line 18 and the concentrated brine line 16 from the electrodialyser 20 are passed through the heat accumulator 60, whereby the excess heat of the fresh water and concentrated brine is recovered, so that the heat recoverer 12 as shown in FIG. 1 can be dispensed with, thus enabling to render the entire system compact.

FIG. 14 illustrates that the heat transfer medium capable of being evaporated and condensed is used in each heat accumulator 60, the fill of the heat transfer medium is made to exceed the upper end of the heat pipe 59, and a gaseous phase section 96 is formed in each heat accumulator 60, through which arranged the heat exchange section 62 of the line 14. With this arrangement, the vapor in the gaseous phase section 96 is condensed on the outer surface of the heat exchange section 62 of the line 14, whereby it gives latent heat of condensation to seawater supplied, so that high heat transfer performance can be attained.

In all the abovedescribed processes, the whole amount of seawater supplied to the electrodialyser is preheated, and further, the present invention proposes a process, wherein the electrodialysers are arranged in multiple stage pattern and the diluted solution, which has been subjected to desalination to a certain extent is heated.

If seawater supplied to the electrodialyser 20 is heated as described above, required electric power can be considerably decreased. However, it requires a large quantity of heat and is uneconomical to heat the whole amount of seawater supplied. More specifically, the total value of electrical resistance in the electrodialyser is divided between the fresh water's portion and the seawater's portion in a proportion of about 68% to 32% for example. So the resistance value of fresh water amounts to as high as scores of to several hundred times that of concentrated brine. After all, it has been found that the decrease in the resistance value through the heating of seawater is mainly caused by the decrease in that of the fresh water's portion. Consequently, it has been found that, when the whole amount of seawater is heated including the concentrated brine, which does not contribute much to the decrease in the resistance value, heat loss is high as compared with the decrease in the resistance value, which proves to be uneconomical.

Figure 15:
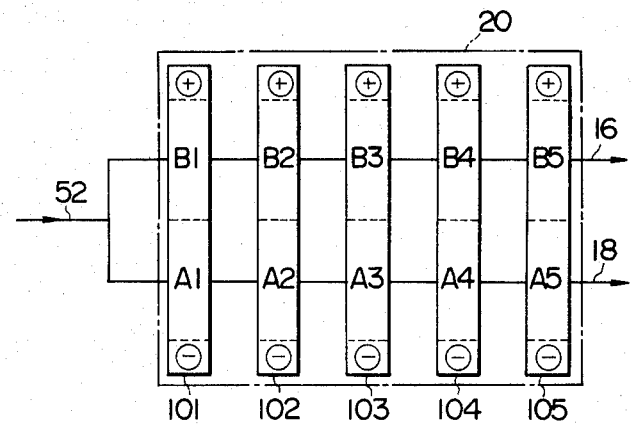
FIG. 15 is a schematic view of an electrodialyser having a plurality of electrodialysis cells connected in series employed in the present invention.
Figure 16:
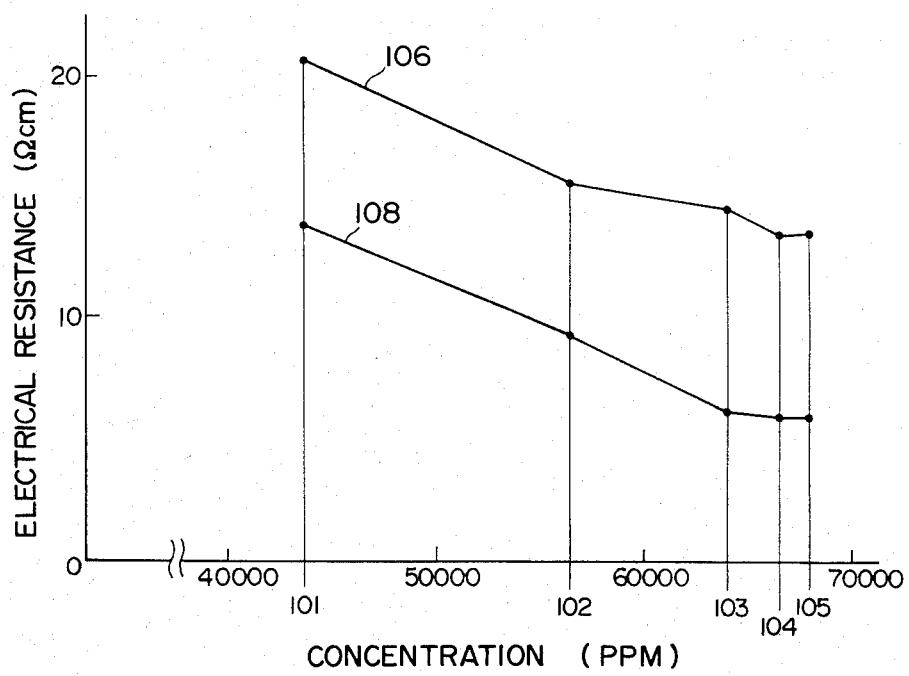
FIGS. 16 and 17 are diagrams illustrating the relationships between concentration of salts and electrical resistance at the dilution compartment and at the concentration compartment of an electrodialyser, respectively.
Figure 17:
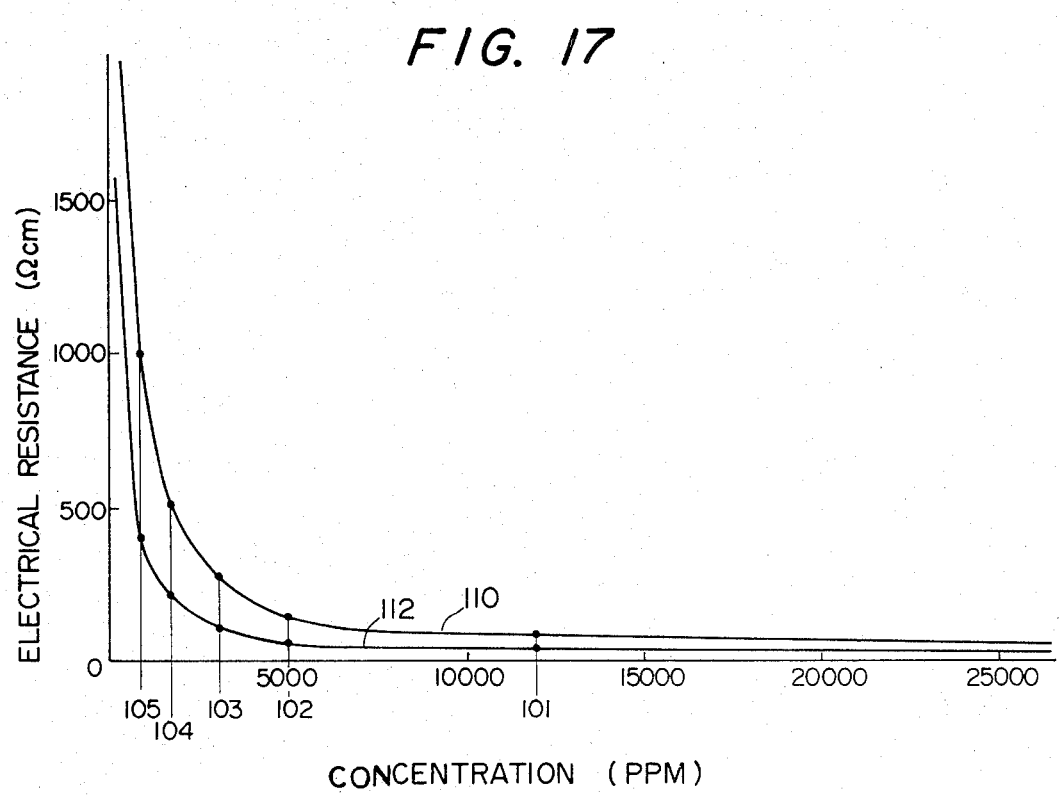

FIGS. 16 and 17 show the results of the studies, wherein using an electrodialyser having therein a plurality (five) of electrodialysis cells 101 to 105 connected in series as shown in FIG. 15, the inlet concentrations of salts at the dilution compartments A1 to A5 and at the concentration compartments B1 to B5 in the respective electrodialysis cells were measured at different temperature conditions, and the electrical resistance values thus obtained were compared. In FIG. 15, designated at 52 is a line for seawater supplied, 16 a line for concentrated brine and 18 a line for fresh water.

Referring to FIG. 16, a curve 106 indicates variations in electrical resistance value of the brine at 10° C. in the concentration compartments, and a curve 108 indicates variations in electrical resistance value of the brine heated to 50° C. In the case of the brine at 10° C., as indicated by the curve 106, the electrical resistance value decreases from 20.4 $\Omega$cm in the first cell 101 to 13.2 $\Omega$cm in the fourth cell 104 and the fifth cell 105. In contrast with this, in the case of the brine heated to 50° C., the electrical resistance value decreases with the increase in concentration from 13.2 $\Omega$cm in the first cell 101 to 6.3 $\Omega$cm in the fourth cell 104 and the fifth cell 105, that is to say, heated brine results in decreased electrical resistance value. However, the brine itself is originally low in electrical resistance value, and even if it is heated, the decreases in the respective cells amount to as low as several $\Omega$cm. When the electrical resistance value of the whole amount of seawater is considered, it is apparent that heating of the brine hardly contributes to the decrease in electrical resistance value of the whole amount of seawater.

On the other hand, referring to FIG. 17, a curve 110 indicates variations in electrical resistance value of the fresh water at 10° C. in the dilution compartments, and a curve 112 indicates variations in electrical resistance value of the fresh water heated to 50° C. In the case of the curve 110, firstly, in the first cell 101, into which seawater flows, the concentration is comparatively high, whereby the electrical resistance value is as relatively low as 66.7 $\Omega$cm. However, in the second cell 102 and further, where the concentration decreases, as shown, the electrical resistance value sharply increases, and, in the fifth cell 105, it amounts to about 1000 $\Omega$cm, which is as high as about 76 times the electrical resistance value of the brine in the same electrodialysis cell. Next, when study is made on the variations in electrical resistance value at 50° C., the electrical resistance value increases with the progress of desalination from 32.8 $\Omega$cm in the first cell 101 to 455 $\Omega$cm in the fifth cell 105, however, the electrical resistances in the respective cells decreases by 47% on the average as compared with those of fresh water at 10° C. If study is made on the decreases in electrical resistance value in the second cell 102 and so forth, where the electrical resistance values particularly sharply increase, the decreases in absolute value of electrical resistance amount to scores of times those of the aforesaid brine being heated as 73.3 $\Omega$cm in the second cell 102, 142 $\Omega$cm in the third cell 103, 273 $\Omega$cm in the fourth cell 104 and 545 $\Omega$cm in the fifth cell 105.

As apparent from the results of the abovedescribed experiments, it is very effective for the decrease in electrical resistance value to heat the fresh water's portion in the electrodialyser within the allowable temperature range for the material quality used in the ion exchange membranes.

Figure 18:
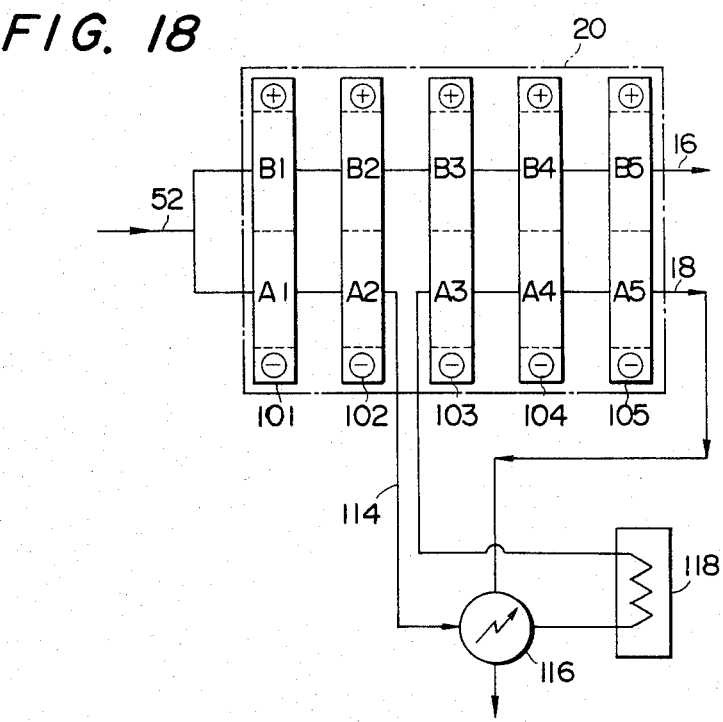
FIG. 18 is a flow diagram of a preferred embodiment according to the present invention using an electrodialyser incorporating a plurality of electrodialysis cells connected in series.

FIG. 18 is a flow diagram showing an embodiment of the electrodialysis process according to the present invention, to which the abovedescribed principle is applied. In FIG. 18, seawater passes through the seawater line 52, is introduced into the electrodialyser 20, where it passes through a plurality of electrodialysis cells 101 through 105 arranged therein, and, at the stage where the concentration at the fresh water's stage is decreased, the semidiluted solution collected at the fresh water's portion in the second cell 102 for example, is extracted by an extraction line 114, subjected to heat exchange with the fresh water of high temperature from the line 18 in a heat recoverer 116, thereafter, introduced into a heater 118, where it is heated further, and introduced into the third cell 103, whereby the fresh water is decreased in electrical resistance value. In this case, the temperature, to which the fresh water (semidiluted solution) is to be heated, is required to remain within the allowable temperature range for use of the ion exchange membranes. The extraction line 114 may be provided on the cell A1, A3 or A4 as for the aforesaid A2. As the heater 118, the heat collector or heat accumulator utilizing the solar heat as aforesaid is usable.

With this embodiment, it is contemplated that the fresh water's portion, whose absolute value of the electrical resistance is scores of to several hundred times higher than that of the brine's portion is mainly heated to decrease the electrical resistance value. Hence, the heat quantity required for heating seawater can be decreased to about one half of the conventional process for example, the rate of decreasing the electrical resistance value can be maintained at a high level, the electric power consumption can be economized, and the fresh water producing efficiency can be considerably improved.

It should be apparent that the above described embodiments are merely illustrative of but a few of the many possible embodiments which represent the application of the principles of the present invention. Numerous and varied other arrangements can be readily devised by those skilled in the art without departing from the scope of the present invention.

What is claimed is:

1. An electrodialysis desalination system for seawater comprising:

preheater means utilizing solar heat for preheating seawater comprising:
 a heat accumulator containing heat transfer medium and provided therethrough with at least one pipeline for supplying seawater in heat transfer relation to said accumulator heat transfer medium;
 a heat collector utilizing solar heat;
 gravity actuated heat pipe means interconnecting said heat collector and said heat accumulator for transferring heat from said heat collector to said heat accumulator, said heat pipe means enclosing a heat transfer medium for repeating evaporation and condensation by heating and cooling, respectively, and having an evaporating portion and a condensing portion separate from and in heat transfer relation respectively with each of said heat collector and said heat accumulator so that heat from said heat collector evaporates the heat transfer medium in said heat pipe means to produce vapor that condenses while transferring heat to said heat accumulator, wherein said heat transfer medium is provided in an amount equal to the amount required to form only a film on the entire inner surface of said heat pipe means, said amount of medium being contained in the evaporation portion only when the medium is in the condensed state so that said heat pipe means transfers vapor only towards said heat accumulator and transfers condensate only towards said heat collector and heat is transferred only to the accumulator by evaporating and condensing;

electrodialyser means having a plurality of ion exchange membranes forming dilute and concentrate chambers therebetween for separating seawater thus preheated by said preheater into two portions including diluted solution and concentrated brine;

means including pipelines for supplying seawater to said preheater and then from said preheater to the electrodialyser;

a bypass line provided between the pipeline leading from the preheater to the electrodialyser and the pipeline for supplying seawater;

control means for detecting temperatures and flow rates of seawater flowing out of the preheater and passing through the bypass line and for controlling the flow rates of seawater in said lines, so that the temperature of seawater flowing into the electrodialyser can be set at a given value of temperature; and gas bubble producing means for cleaning said ion exchange membranes by passing bubbles through said chambers, cleaning the gas after it has passed through said chambers and recirculating the cleaned gas to the electrodialyser.

2. An electrodialysis desalination system according to claim 1, wherein a three-way flow control valve is used at a jointing portion between the outlet line of the preheater and the bypass line as the flow rate control means for the lines.

3. An electrodialysis desalination system according to claim 1, wherein said electrodialyser means is provided in plural numbers, said means including pipelines passing seawater serially through the dilute chambers to a dilute solution discharge and separately serially passing the concentrated brine through concentrate chambers to a separate brine discharge, and said means including pipelines further connecting said preheater serially between two chambers in adjacent electrodialyser means for preheating at least one of the corresponding diluted solutions or concentrated brine solution between said adjacent chambers.

4. An electrodialysis desalination system according to claim 3, wherein said means including pipelines further serially connects said preheater between the downstream most chamber and one of the discharge for providing indirect heat exchange between one of the diluted solutions or concentrated brine solutions after it leaves the last of said chambers and the corresponding diluted solutions or concentrated brine solutions between said adjacent chambers.

5. An electrodialysis desalination system according to claim 4, including a further separate heater supplying heat to said one of said diluted solutions or concentrated brine solutions between said adjacent chambers.

6. A system according to claim 1, wherein said heat pipe means is installed in an inclined manner from the heat accumulator downwardly to the heat collector.

7. An electrodialysis desalinization system according to claim 1, wherein the heat accumulator is divided into a liquid phase portion, said liquid phase portion containing an evaporating portion of said heat pipe means and liquid heat transfer medium, and a gaseous phase portion containing gaseous heat transfer medium, and wherein a seawater supply pipeline is provided in the gaseous phase portion to be heated by condensation heat of the gaseous heat transfer medium in said gaseous phase portion.

8. An electrodialysis desalination system for seawater according to claim 1, wherein the heat collector, heat accumulator and heat pipe means for connecting the heat collector to the heat accumulator are provided in plural numbers, respectively, a plurality of heat pipes are parallelly arranged in the respective heat collectors, and said heat pipes are connected at least at the side of the heat pipes opposite the heat receiving sides thereof through a heat transfer plate.

9. An electrodialysis desalination system for seawater comprising:

preheater means utilizing solar heat for preheating seawater comprising:

a heat accumulator containing heat transfer medium and provided therethrough with at least one pipeline for supplying seawater in heat transfer relation to said accumulator heat transfer medium;

a heat collector utilizing solar heat;

gravity actuated heat pipe means interconnecting said heat collector and said heat accumulator for transferring heat from said heat collector to said heat accumulator, said heat pipe means enclosing a heat transfer medium for repeating evaporation and condensation by heating and cooling, respectively, and having an evaporating portion and a condensing portion separate from and in heat transfer relation respectively with each of said heat collector and said heat accumulator so that heat from said heat collector evaporates the heat transfer meadium in said heat pipe means to produce vapor that condenses while transferring heat to said heat accumulator, wherein said heat transfer medium is provided in an amount equal to the amount required to form only a film on the entire inner surface of said heat pipe means, said amount of medium being contained in the evaporation portion only when the medium is in the condensed state so that said heat pipe means transfers vapor only towards said heat accumulator and transfers condensate only towards said heat collector and heat is transferred only to the accumulator by evaporating and condensing;

electrodialyser means having a plurality of ion exchange membranes forming dilute and concentrate chambers therebetween for separating seawater thus preheated by said preheater into two portions including a diluted solution and a concentrated brine; and means including pipelines for supplying seawater to said preheater and then from said preheater to the electrodialyser; wherein the heat collector, the heat accumulator and the heat pipes for connecting the heat collector to the heat accumulator are provided in plural numbers, respectively, a plurality of heat pipes are parallelly arranged in the respective heat collectors, and said heat pipes are connected at least at the side opposite the heat receiving sides thereof through a heat transfer plate, the heat collector having a plate incorporating therein a plurality of heat pipes parallelly arranged, and said plate is disposed intermediate between a Fresnel lens for receiving solar heat and the focal point of said lens.

10. A system according to claim 9, wherein said heat pipe means is installed in an inclined manner from the heat accumulator downwardly to the heat collector.

11. An electrodialysis desalination system according to claim 9, wherein said plate is disposed in an elongate vessel having a 'U' shaped cross-section, on the top of which is provided the Fresnel lens, and said vessel is rotatable, so that the surface of the Fresnel lens can be directed in the same direction as the solar rays.

12. An electrodialysis desalination system according to claim 11, wherein at least one pipeline for diluted solution and a pipeline for concentrated brine solution from the electrodialyser is provided in the heat accumulator filled so as to recover excess heat.

13. An electrodialysis desalinization system according to claim 12, wherein the heat accumulator is divided into a liquid phase portion, said liquid phase portion containing an evaporating portion of said heat pipe means and liquid heat transfer medium, and a gaseous phase portion containing gaseous heat transfer medium, and wherein a seawater supply pipeline is provided in the gaseous phase portion to be heated by condensation heat of the gaseous heat transfer medium in said gaseous phase portion.

14. An electrodialysis desalinization system according to claim 11, wherein the heat accumulator is divided into a liquid phase portion, said liquid phase portion containing an evaporating portion of said heat pipe means and liquid heat transfer medium, and a gaseous phase portion containing gaseous heat transfer medium, and wherein a seawater supply pipeline is provided in the gaseous phase portion to be heated by condensation heat of the gaseous heat transfer medium in said gaseous phase portion.

15. An electrodialysis desalination system for seawater comprising:
    preheater means utilizing solar heat for preheating seawater comprising:
        a heat accumulator containing heat transfer medium and provided therethrough with at least one pipeline for supplying seawater in heat transfer relation to said heat transfer medium in the heat accumulator;
        a heat collector utilizing solar heat;
        gravity actuated heat pipe means interconnecting said heat collector and said heat accumulator, said heat pipe means enclosing a heat transfer medium for repeating evaporation and condensation by heating and cooling, respectively, and having an evaporating portion and a condensing portion separate from and in heat transfer relation respectively with each of said heat collector and said heat accumulator so that heat from said heat collector evaporates the heat transfer medium in said heat pipe means to produce vapor that condenses while transferring heat to said heat accumulator, wherein said heat transfer medium is provided in an amount equal to the amount required to form only a film on the entire inner surface of said heat pipe means, said amount of medium being contained in the evaporation portion only when the medium is in the condensed state so that said heat pipe means transfers vapor only towards said heat accumulator and transfers condensate only towards said heat collector and heat is transferred only to the accumulator by evaporating and condensing;
    electrodialyser means having a plurality of ion exchange membranes forming dilute and concentrate chambers therebetween for separating seawater thus preheated by said preheater into two portions including a diluted solution and a concentrated brine; and
    means including pipelines for supplying water to said preheater and then from said preheater to the electrodialyser wherein the heat accumulator is divided into a liquid phase portion, said liquid phase portion containing the evaporating portion of said heat pipe means and liquid heat transfer medium, and a gaseous phase portion containing gaseous heat transfer medium, and wherein a seawater supply pipeline is provided in the gaseous phase portion to be heated by condensation heat of the gaseous heat transfer medium in said gaseous phase portion.

16. An electrodialysis desalination system according to claim 15, the heat collector has a plate incorporating therein a plurality of heat pipes parallelly arranged, and said plate is disposed intermediate between a Fresnel lens for receiving solar heat and the focal point thereof.

17. An electrodialysis desalination system according to claim 16, wherein said plate is disposed in an elongate vessel having a letter 'U' shaped cross-section, on the top of which is provided a Fresnel lens, and said vessel is rotatable, so that the surface of Fresnel lens can be directed in the same direction as the solar rays.

18. An electrodialysis desalination system according to claim 15, wherein at least one pipeline for diluted solution and a pipeline for concentrated brine from the electrodialyser is provided in the heat accumulator in the liquid phase portion so as to recover excess heat from the diluted solution and the concentrated brine.

19. An electrodialysis desalination system according to claim 15, wherein said electrodialyser means is provided in plural numbers, said means including pipelines passing seawater serially through the dilute chambers to a dilute solution discharge and separately serially passing the concentrated brine through concentrate chambers to a separate brine discharge, and said means including pipelines further connecting said preheater serially between two chambers in adjacent electrodialyser means for preheating at least one of the corresponding diluted solutions or concentrated brine solutions between said adjacent chambers.

20. A system according to claim 15, wherein said heat pipe means is installed in an inclined manner from the heat accumulator downwardly to the heat collector.

* * * * *